FIG.7
1000°F Cracking
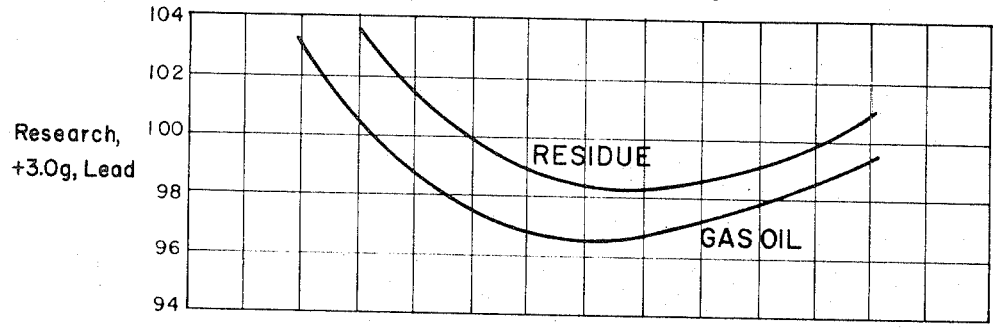
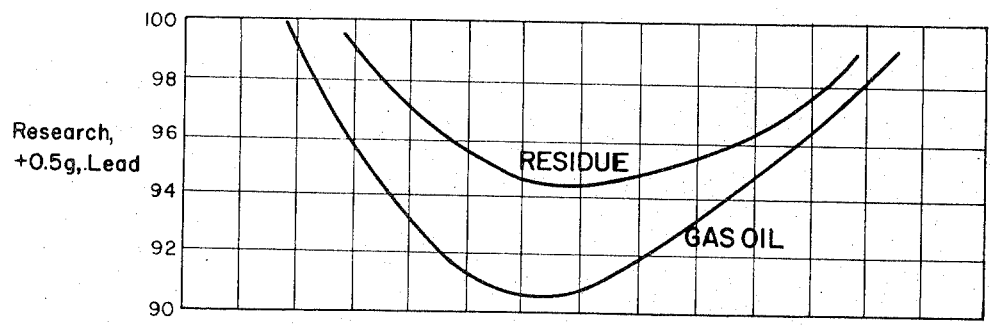
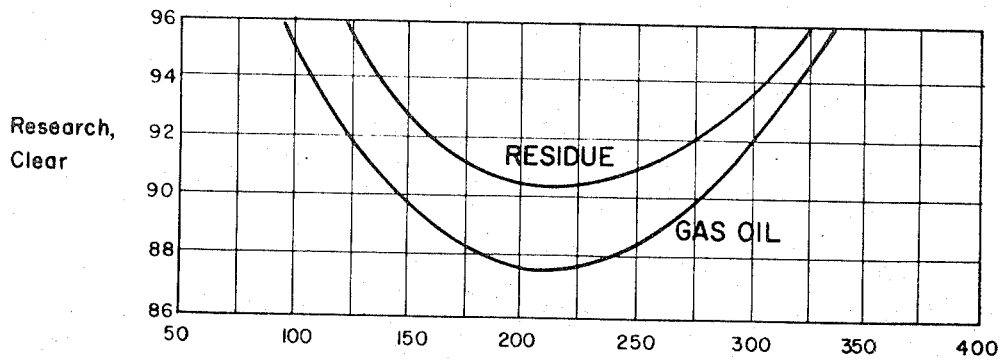
TRUE BOILING POINT-°F

FIG.8
950°F Cracking
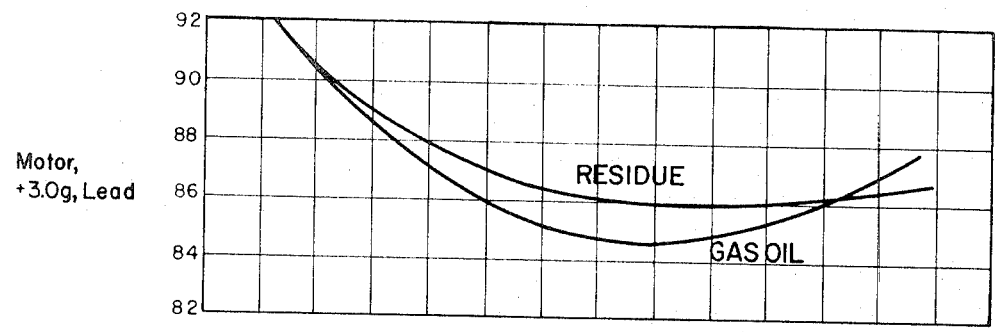
Motor, +3.0g, Lead
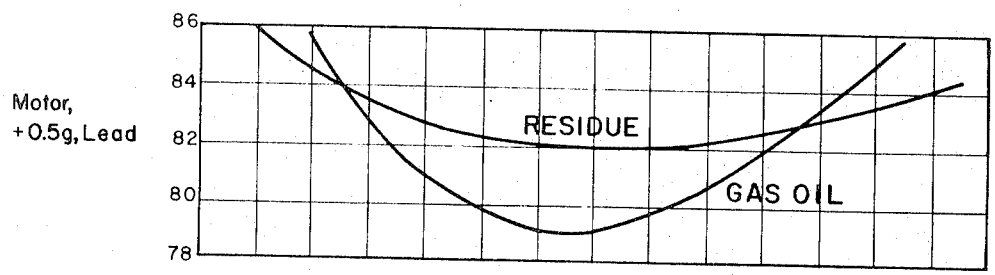
Motor, +0.5g, Lead
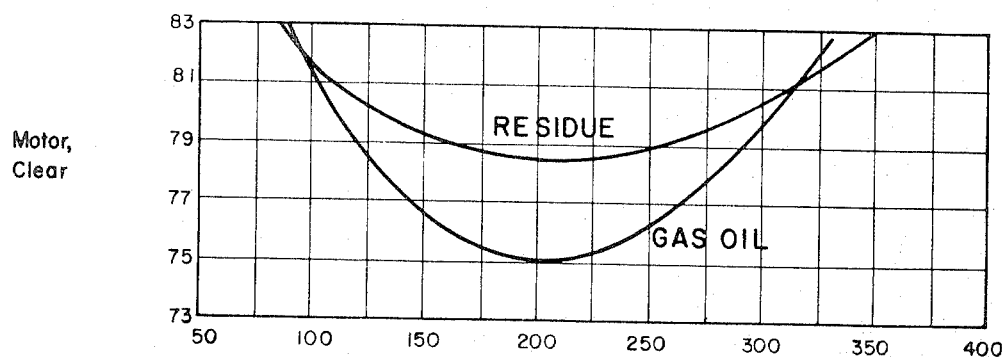
Motor, Clear
TRUE BOILING POINT - °F

FIG. 9
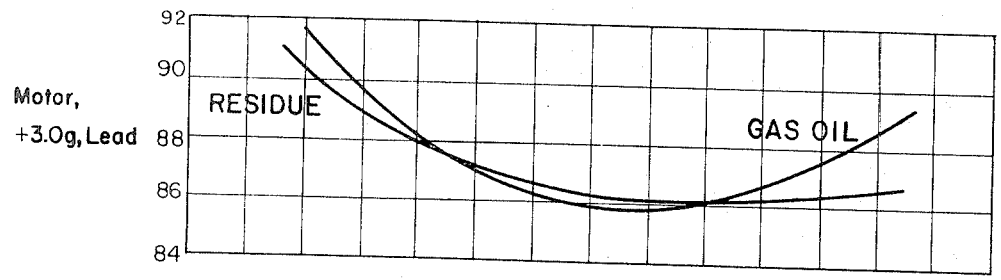
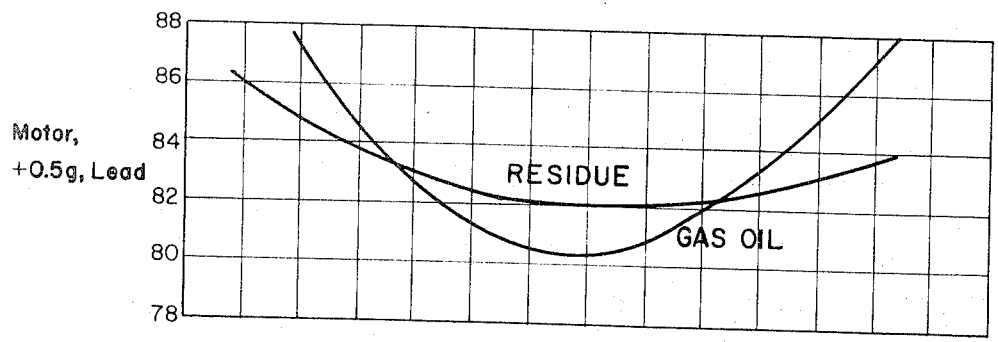
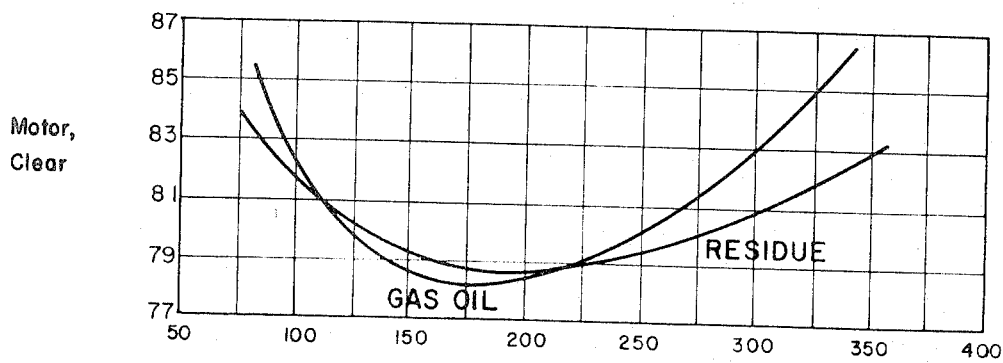
TRUE BOILING POINT-°F

VOLUME PERCENT OF LIQUID FEED
BOILING ABOVE RISER EQUILIBRIUM TEMPERATURE

United States Patent Office 3,785,959
Patented Jan. 15, 1974

3,785,959
PROCESS FOR CRACKING HYDROCARBONS
CONTAINING RESIDUAL OIL
Millard C. Bryson, Conway, Joel D. McKinney, Indiana, Robert A. Titmus, Pittsburgh, and Frederick K. White, Allison Park, Pa., assignors to Gulf Research & Development Company, Pittsburgh, Pa.
Filed Jan. 10, 1972, Ser. No. 216,429
Int. Cl. C10g *11/04;* C10l *1/04*
U.S. Cl. 208—120                                    19 Claims

ABSTRACT OF THE DISCLOSURE

In fluid catalytic riser cracking of a gas oil with a zeolite catalyst the inclusion of controlled amounts of residual oil in the feed results in an improvement in octane value and/or improvement in the distribution of octane value of the gasoline product. This improvement in octane value occurs primarily in the particular boiling range fractions of the gasoline product having the lowest octane value. However, residual oil is relatively difficult to vaporize and the extent of its vaporization will depend on the equilibrium flash vaporization temperature at the bottom or inlet of the riser. The equilibrium flash vaporization temperature at the bottom of the riser is generally limited by such process necessities as avoidance of catalyst sintering or deactivation and/or avoidance of excessive catalyst to oil ratios, which can adversely affect product selectivity. Therefore, the quantity of residual oil in the feed must be controlled in relation to the equilibrium temperature in order to, on the one hand, vaporize and crack a sufficient quantity of residual oil to obtain the octane improvement effect, while, on the other hand, keeping the quantity of residual oil which remains unvaporized below a specified level. It is shown that at a fixed equilibrium flash vaporization temperature the quantity of residual oil which is vaporized cannot be increased merely by large increases in the proportion of residue in the feed.

---

Figure 1:
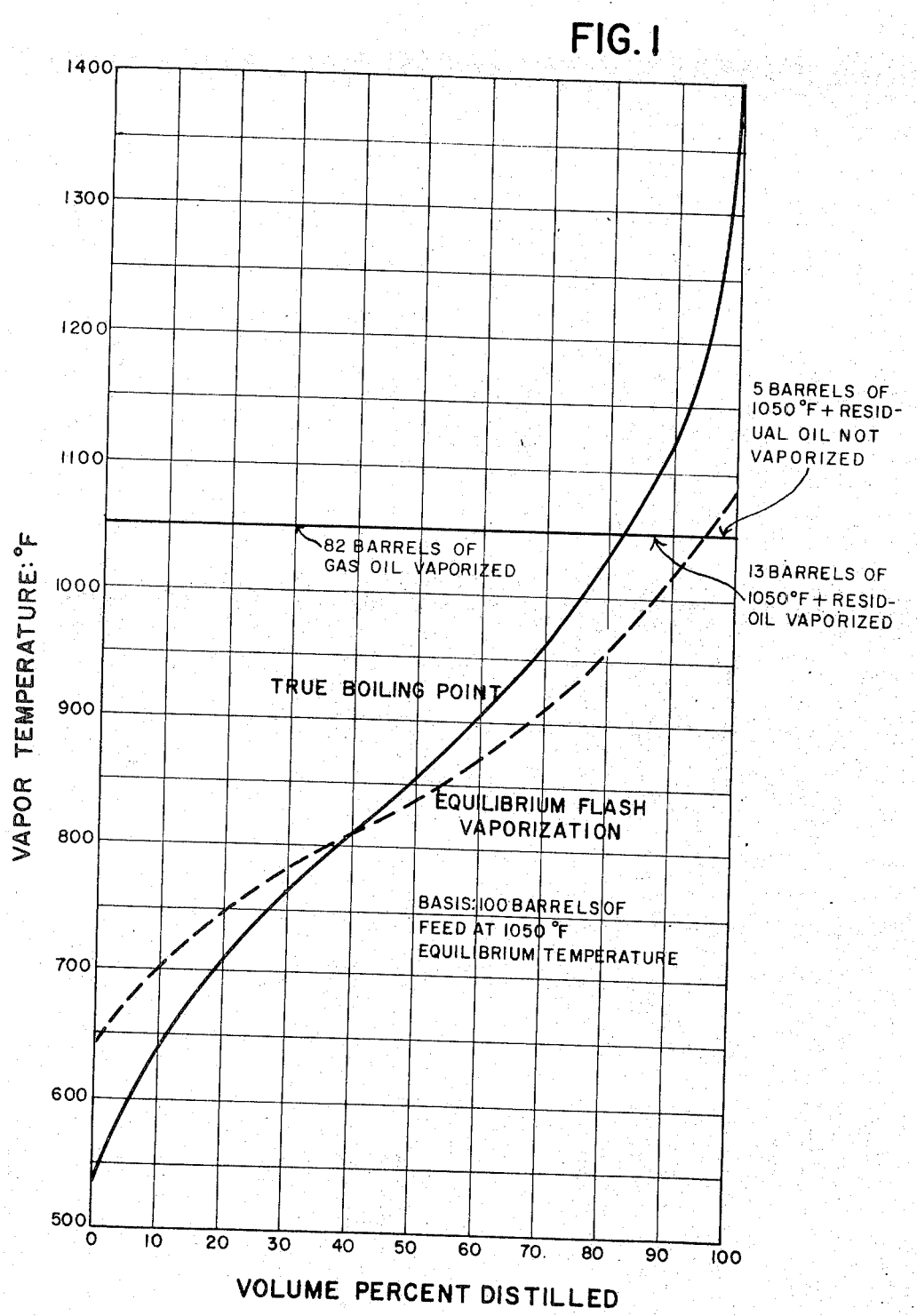

This invention relates to the improvement in octane number of a gasoline product obtained by fluid zeolite catalytic cracking of a feed comprising primarily gas oil boiling range hydrocarbons by including a minor proportion of residual oil in the feed stream. The cracking occurs without added hydrogen and the invention does not require hydrodesulfurization of the residual oil, although it can be improved thereby.

Newer model automobile engines are designed with lower compression ratios than heretofore in order to utilize no-lead or low-lead gasoline as fuel. These engines sometimes exhibit a hesitation upon acceleration from a full stop. This hesitation arises due to uneven burning of fuel upon surge resulting in low fuel efficiency. This uneven burning is due to the presence of the higher boiling gasoline components, i.e. gasoline components boiling above 360° F. or 380° F. up to 400 or 430° F., since these higher boiling components include aromatic types which are difficult to ignite. The difficulty can be corrected by removal of these components. However, the high boiling gasoline components include some of the highest octane components in the full-range gasoline. The present invention tends to mollify the loss in octane value due to omission of 360° F.+ or 380° F.+ material from gasoline when a 360 or 380° F. or lower end point gasoline is being produced by upgrading the octane value of the mid-boiling range fraction of the gasoline, i.e. that fraction of the gasoline boiling in the 125 to 300° F. range, which includes the lowest octane fraction of the gasoline. This effect occurs independentnly of blending. When a full-range (100° F. or $C_5$ to 400, 430 or 450° F.) gasoline product is being produced the present invention can provide a generally higher octane value over the full-range gasoline product as well as contributing to more uniform octane values between the highest and lowest boiling fractions of the gasoline (the highest and lowest boiling fractions have a relatively high octane value) on the one hand and the middle boiling gasoline fraction (which has a relatively low octane value) on the other hand. Therefore, the present invention has utility in the production of both low end-point gasoline (360 or 380° F.) or standard end point gasoline (400° F., or higher).

Thhe presence of residual oil in the feed of the present invention provides an improved unleaded octane value in the fraction of the gasoline product boiling between 125 and 300° F., generally, between 150 and 275° F., more specifically, and between 175 and 250° F., most specifically, as compared to the gasoline product from a feed comprising gas oil distillate only. Thhe improvement is primarily achieved in unleaded Research octane value but can also be achieved in unleaded Motor octane value. The improvement can similarly be achieved in leaded octane values. It is an important advantage of this invention that the gasoline fractions improved in octane value are the fractions of the gasoline product possessing the lowest octane values. Inclusion of the residual feed can also increase the octane value of the lowest and highest boiling fraction of the gasoline product. Generally, however, the degree of improvement is most noticeable in the mid-boiling fraction. In an event, the full range gasoline product is improved.

Thhe present invention applies to the type of riser cracking systems now in use employing riser outlet temperatures between 900 and 1100° F., a relatively low pressure which is not critical and can be about 5 to 50 p.s.i.g., a residence time of up to 5 seconds and catalyst to oil weight ratios between 4:1 and 25:1, generally, 5:1 and 15:1, preferably, and 6:1 and 12:1, most preferably. Regenerated catalyst temperatures between 1100° F. and 1350° F., generally, and between 1225° F. and 1325° F., preferably, can be employed. These riser systems operate with catalyst and hydrocarbon feed flowing concurrently into and through the riser at about the same velocity, thereby avoiding any significant slippage of catalyst relative to hdrocarbon in the riser and avoiding fromation of a catalyst bed in the reaction flow stream. In this manner the catalysts to oil ratio does not increase significantly from the riser inlet along the reaction flow stream. The catalyst employed is a fluid crystalline aluminosilicate molecular seive catalyst. Any catalyst of sufficient activity and/or selectivity to produce significant feed stock cracking to gasoline at residence times of five seconds or less is within the purview of this invention.

Four tests were conducted to illustrate the effect of blending residual oil into a gas oil distillate feed stream so that residual oil and gas oil were added together at the bottom of a riser. The tests were performed in a fluid catalytic riser cracking system employing a zeolite catalyst. The unit operating conditions were held as constant as possible throughout all the tests. A uniform fresh feed rate was maintained during the tests. The reactor outlet temperature was maintained at 930° F., the regenerator bed temperature at 1220 to 1235° F. and the feed preheat temperature at 340 to 375° F. Slurry recycle varied between 4.7 volume percent and 8.7 volume percent of fresh feed.

The basic gas oil feed had a 5 percent distillation temperature of 577° F. and a 90 percent distillation temperature of 920° F. and had a gravity of about 24° API, The residual oil blended into the unit was 100 percent South Louisiana vacuum tower bottoms boiling at 1050° F.+ and having a gravity of 11° API. As shown in Table 1, residual charge to the unit was absent in the base case and then was set at three incremental rates: 5.1 volume percent, 10.1 volume percent and 14.7 volume percent of the fresh feed. As the residual oil content was increased from the zero percent residual oil level to the 14.7 volume percent residual oil level, the hydrogen make increased from 0.32 volume percent to 0.73 volume percent and the coke make increased from 4.93 weight percent only to 5.47 weight percent, which is a very small increase. All of the light end components (methane through butane-butenes) decreased with increasing residual levels from a total volume percentage of 35.67 percent to 25.82 percent. Also, with increasing residual contents, the gasoline yield increased from 60.4 volume percent to 62.0 volume percent. The yield of products heavier than gasoline (light gas oil and decanted oil) showed an increase with increasing residual level, with the greatest portion of the change occurring with highest residual contents in the feed. Finally, with increasing residual feed content the conversion to gasoline and lighter products decreased from 80.2 volume percent to 75.3 volume percent. Selectivity to gasoline (measured as a ratio of gasoline yield to conversion) increased from 0.753 for the gas oil feed to 0.823 for the highest residual-gas oil feed mix of the fourth test of Table 1. Therefore, if proper conditions are achieved at the onset o fthe cracking reaction, i.e. at the bottom of the riser, the portion of the feed boiling higher than 1050° F. true boiling point is highly selective towards gasoline production. It yields increased gasoline selectivity in comparison to that yielded from the feed boiling below 1050° F., i.e. typical virgin gas oil distillate, at comparable cracking conditions.

398° F. It is emphasized that the coke yield varied very little in all the tests, indicating that a uniformly high percentage of the oil was vaporized in each of the tests.

The data of Table 1 illustrates the critical effect upon gasoline product octane value of the amount of residual oil in a gas oil distillate feed stream. FIGS. 1 through 5 illustrate how to determine whether the amount of 1050° F.+ residual oil present in a feed stock to a riser operating at a particular feed-catalyst equilibrium temperature at the riser inlet will provide an octane number improvement in tests as illustrated in Table 1. In order for the residual oil to affect the product octane value, the high boiling residue feed components must vaporize at the riser inlet because only by vaporization can any feed component be cracked to gasoline and other products and exert an advantageous effect upon the process. Most residual feed components that do not vaporize remain on the hot catalyst surface and tend to be converted to coke, thereby resulting in a loss of useful product and a lowering of catalyst activity. This deleterious effect occurs in addition to the deposition upon the catalyst of the metals content of the residual oil, especially nickel and vanadium, further tending to reduce catalyst activity and selectivity.

Vaporization of feed, especially of high boiling residual feed components, if it is to occur, must occur at the riser inlet where the catalyst is fresh from the regenerator and is therefore the hottest and most active and most selective. The riser temperature drops along the riser length due to heating and vaporization of the feed, the slightly endothermic nature of the cracking reaction and heat loss to the atmosphere. Because nearly all the cracking in the system occurs within one or two seconds, TABLE 1
Gasoline octane ratings

| Inspection | Gas oil plus 0.0 percent residual | Gas oil plus 5.1 percent of 1,050° F. plus residual | Gas oil plus 10.1 percent of 1,050° F. plus residual | Gas oil plus 14.7 percent of 1,050° F. plus residual |
|---|---|---|---|---|
| Light gasoline: | | | | |
| Motor octane numbers: | | | | |
| Clear | 80.4 | 80.0 | 80.4 | 80.9 |
| +0.53 grams lead | 84.0 | 84.0 | 82.9 | 84.5 |
| +1.59 grams lead | 87.0 | 85.9 | 84.3 | 85.5 |
| +3.17 grams lead | 88.4 | 87.4 | 86.0 | 86.5 |
| Research octane numbers: | | | | |
| Clear | 92.0 | 92.4 | 91.8 | 92.5 |
| +3.17 grams lead | 99.6 | 99.8 | 100.1 | 100.5 |
| Heavy gasoline: | | | | |
| Motor octane numbers: | | | | |
| Clear | 81.1 | 80.7 | 82.0 | 81.1 |
| +0.53 grams lead | 83.6 | 84.6 | 84.0 | 84.5 |
| +1.59 grams lead | 86.0 | 85.6 | 85.5 | 85.2 |
| +3.17 grams lead | 87.7 | 87.2 | 87.4 | 86.8 |
| Research octane numbers: | | | | |
| Clear | 93.0 | 92.8 | 92.7 | 95.1 |
| +3.17 grams lead | 98.6 | 98.0 | 98.7 | 98.5 |

As shown in Table 1, all the octane ratings remained essentially the same during the tests with only one exception. Table 1 shows that adding 5.1 percent or 10.1 percent of 1050° F.+ residual oil to the gas oil feed liquid did not affect the octane number of the gasoline product. An effect on octane number appeared for the first time when 14.7 percent of 1050° F.+ residual oil was added to the gas oil feed and then the effect was apparent only in the heavy gasoline product fraction (unleaded) and not in the light gasoline product fraction. Table 1 therefore indicates that as much as 10.1 percent residual oil had on effect upon the octaine number of either light or heavy gasoline product and an effect did not appear until 14.7 percent of residual oil was added, whereupon the effect was apparent only in the heavy gasoline fraction and amounted to more than two Research octane numbers on an unleaded basis. In the data of Table 1, the light gasoline fraction had a 5 percent temperature of 110° F. and a 90 percent temperature of 234° F. while the heavy gasoline fraction had a 5 percent temperature of 239° F. and a 90 percent temperature of it is necessary that feed vaporization occur nearly instantaneously upon contact of feed and regenerated catalyst at the bottom of the riser. Therefore, at the riser inlet, the hot, regenerated catalyst and preheated feed, generally together with a mixing agent such as steam, nitrogen, methane, ethane or other light gas, are intimately admixed to achieve an equilibrium temperature nearly instantaneously. This equilibrium temperature is referred to herein as the equilibrium flash vaporization temperature of the feed because it is in the process of achieving this temperature that all the feed components that are to vaporize do vaporize. At this equilibrium temperature substantially complete heat exchange between all materials fed to the riser is achieved and all these materials achieve about the same temperature level, i.e. the hot, freshly regenerated catalyst is cooled to the equilibrium temperature by contributing the sensible heat required to raise the feed liquid to the temperature of vaporization, by contributing latent heat of vaporization and by contributing superheating heat to heat the vaporized liquid above the temperature of vaporization. At the completion of this heat exchange process at the riser inlet, the catalyst, the mixing fluid, the vaporized feed and the unvaporized feed are all at about the same temperature, which is the equilibrium flash vaporization temperature of the system.

It is desirable for the equilibrium flash vaporization temperature to be as high as possible in order to vaporize as much of the feed as possible. It is best to achieve this high equilibroum temperature by utilizing a high regenerator temperature. However, the regenerator temperature is limited by many factors inherent in the system such as suscepibility of the catalyst to sintering and deactivation, equipment metallurgical temperature limitations, the amount of carbon on the deactivated catalyst, etc. A much less desirable method of increasing the equilibrium temperature is by arbitrary increase of catalyst feed per rate because high catalyst-to-oil ratios are known to reduce seelctivity to gasoline product by increasing production of undesirable products. Therefore, in any given reactor-regenerator system operating in a heat-balance relationship the equilibrium flash vaporization temperature should be held to the lowest practical level if an increase must be made at the price of increasing the catalyst-to-oil ratio.

Since the equilibrium flash vaporization temperature is essentially fixed by the regenerator temperature, the oil feed rate, the oil preheat temperature and the catalyst-to-oil ratio, in accordance with the present invention the quantity of residual oil which is vaporized at a given equilibrium temperature is established by adjusting the proportion of residual oil to gas oil boiling range material in the feed. The equilibrium flash vaporization temperature will be between the regenerated catalyst temperature and the riser outlet temperature. At the equilibrium flash vaporization temperature, essentially all the gas oil boiling range material having a true boiling point above the gasoline product and below 1050° F. will be vaporized and all or most of the 1050° F.+ residual oil will also be vaporized. It is only vaporized material that can be cracked to lighter useful products such as gasoline and furnace oil since, as stated, the unvaporized material tends to be converted to coke on the surface of the catalyst.

In accordance with this invention the amount of residue having a true boiling point above 1050° F. in the gas oil liquid feed is always only a minor proportion (much less than 50 volume percent, preferably less than 20 or 25 to 30 or 35 volume percent) of the hydrocarbon feed, and most preferably between 15 and 21 percent, while the material having a true boiling point below 1050° F. constiutes the remaining and major proportion of the liquid feed. The ratio of 1050° F.+ residue to 400° F. or 430° F. to 1050° F. gas oil feed (gas oil comprises the hydrocarbons boiling above gasoline but below the 1050° F.+ residue) is adjusted in accordance with this invention either by blending a stream of 1050° F.+ residual material into a gas oil distillate stream or by preparing the total feed directly by adjusting the distillation or flash temperature of a total crude or a reduced crude distillation unit. In either case, the proportion of 1050° F.+ residue to lower boiling feed must be sufficiently low on the one hand that at least 90 volume percent of the total feed is vaporized at the equilibrium flash vaporization temperature. Preferably, 95 percent of the total feed is vaporized. Most preferably, at least 98 or 99+ percent of the total feed is vaporized. On the other hand, the ratio of 1050° F.+ residue to lower boiling feed must be sufficiently high in relation to the equilibrium temperature than adequate 1050° F.+ residue is vaporized and thereby available to be cracked to and improve the octane value of the gasoline product as compared to the octane value that can be achieved under the same conditions and at the same equilibrium temperature in the absence of the 1050° F.+ residue. Sufficient residue should be vaporized at least to improve the octane value of the heavy (250 to 400° F.+) gasoline fraction and preferably to also improve the octane value of the lighter (100 to 250° F.) gasoline fraction. If 100 percent of the feed is vaporized at the equilibrium temperature the equilibrium temperature must be sufficiently high so that the proportion of 1050° F.+ vapors in the total vapors is adequate to improve the octane number of the gasoline product.

The criticality to the present invention of slight variations in 1050° F.+ residue content in the hydrocarbon feed is appreciated by referring to the accompanying figures. FIG. 1 shows the volume percent of a particular total hydrocarbon feed vaporized at various temperatures. The hydrocarbon feed is the bottoms of an atmospheric distillation tower employed as an FCC feed. The solid curve shown in FIG. 1 represents the true boiling point characteristics while the dashed curve represents the equilibrium flash vaporization characteristics of the feed. For the feed shown in FIG. 1, there is a substantial difference in the characteristics of the feed according to the two curves and FIG. 1 illustrates that for the purposes of the present invention it is the equilibrium flash vaporization characteristics that are controlling.

Assuming the equilibrium temperature at the bottom of the riser is fixed at 1050° F. by process conditions, then FIG. 1 shows that the feed at the bottom of the riser on a 100 barrel basis will comprise 82 barrels of vaporized gas oil having a true boiling point below 1050° F., 13 barrels of vaporized 1050° F.+ true boiling point residue and 5 barrels of unvaporized residue having a true boiling point above 1050° F. The data shown in Table 1, above, show that the octane improvement effect of the present invention in the particular tests made only begins to become manifest at a residual content in the feed between 10.1 percent and 14.7 percent and, even then, the octane improvement effect appeared in the heavy gasoline fraction only. Therefore, at an equilibrium temperature of 1050° F. with the feed shown in FIG. 1, the 13 barrels of 1050° F.+ residue which is vaporized would be on the borderline of effectiveness when charging the particular feed shown with the particular catalyst at the particular riser outlet temperature of the tests of Table 1.

Figure 2:
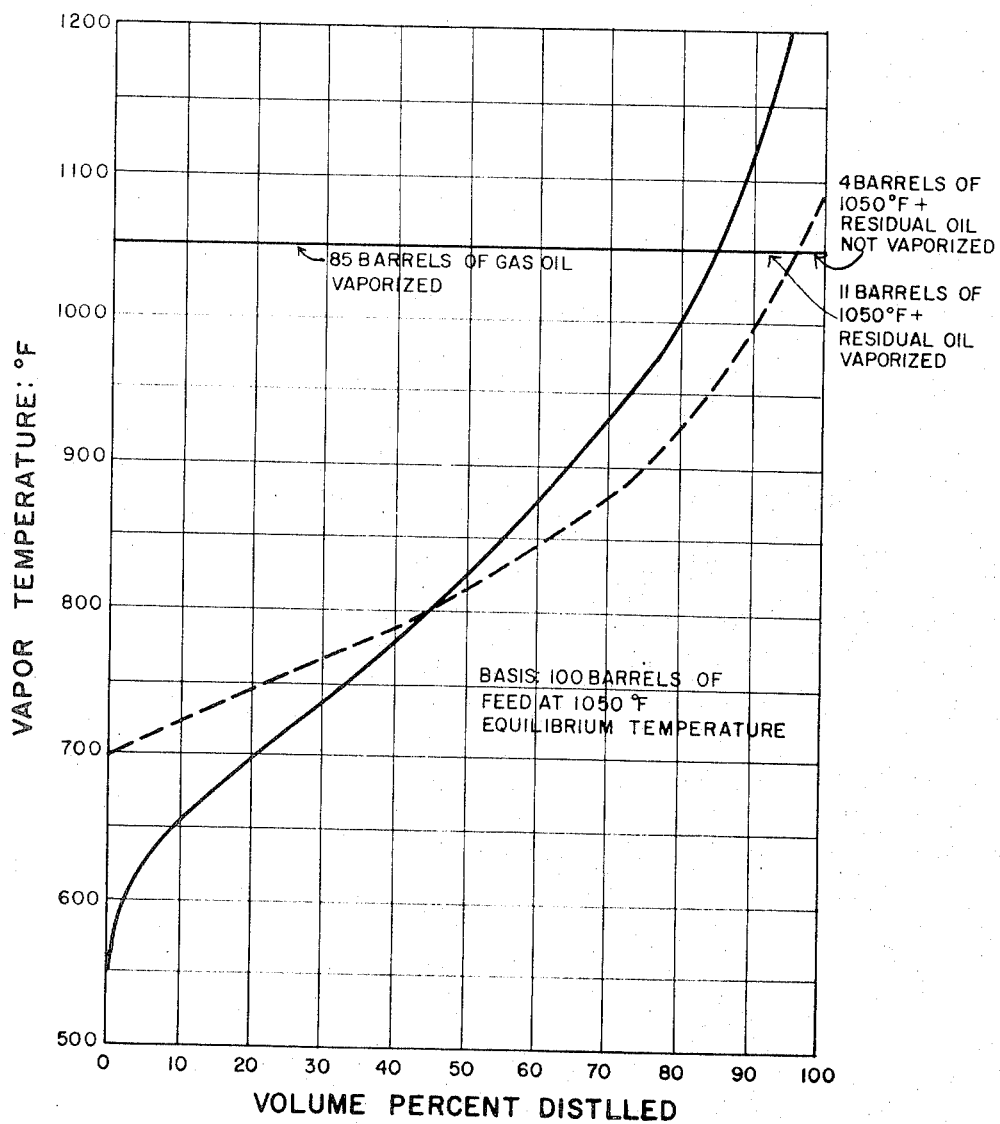

FIG. 2 shows an FCC feed stock of only a slightly different composition as compared to the feed stock of FIG. 1. FIG. 2 represents the characteristics of the bottoms of an atmospheric distillation or flashing of a crude oil. As shown in FIG. 2, at an equilibrium temperature of 1050° F., on a basis of 100 barrels of feed, 85 barrels of gas oil having a true boiling point below 1050° F. were vaporized, 11 barrels of 1050° F.+ true boiling point residual oil were vaporized and 4 barrels of residual oil were not vaporized. Comparing FIGS. 1 and 2, it is seen that feed stocks providing a slightly different extent of residual vaporization at the equilibrium temperature can be prepared, one of which might provide the octane improvement of this invention while the other might not, based upon the conditions of the tests of Table 1.

Figure 3:
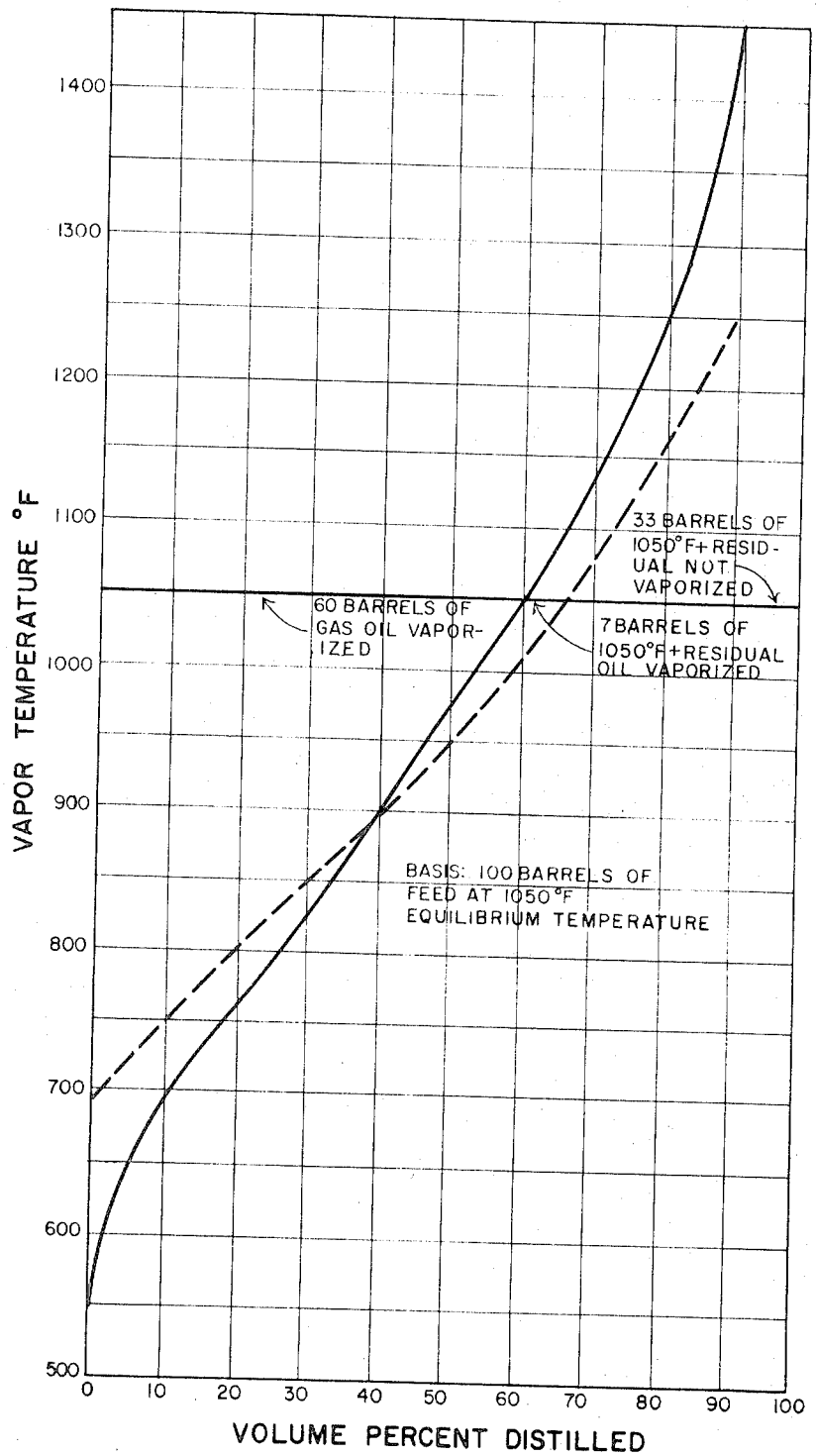

In sharp contrast to the feed stocks of FIGS. 1 and 2, FIG. 3 shows the true boiling point data and flash equilibrium data of an atmospheric tower bottoms FCC feed stock which is totally unsuitable for purposes of this invention. As shown in FIG. 3, at a 1050° F. equilibrium temperature, on a 100 barrel basis, the feed comprises 60 barrels of gas oil vapor having a true boiling point below 1050° F., only 7 barrels of residual oil vapor having a true boiling point above 1050° F. and 33 barrels of unvaporized residue having a true boiling point above 1050° F. The feed stock of FIG. 3 is unsuitable for use at a 1050° F. equilibrium temperature because more than 10 percent is unvaporized. However, the very important comparison is made between the feed stock of FIG. 3 and the feed stocks of FIGS. 1 and 2, that there is considerably less 1050° F.+ residue vaporized at the same equilibrium temperature in the case of the feed stock of FIG. 3 than in the case of the feed stocks of FIGS. 1 and 2, even though the feed stock of FIG. 3 contains a considerably higher proportion of 1050° F.+ residue than the feed stocks of FIGS. 1 and 2. FIG. 3 shows that when the quantity of 1050° F.+ residue in the feed exceeds 40 or 50 percent, the amount of 1050° F+ residue that can be vaporized decreases. Therefore, the present invention does not apply to feeds having excessively high residue contents.

A comparison of FIG. 3 with FIGS. 1 and 2 therefore shows that the amount of 1050° F.+ material vaporized in the riser does not increase merely by increasing the absolute quantity of 1050° F.+ true boiling point material in the feed. The comparison of the figures shows that the amount of 1050° F.+ true boiling point residue actually vaporized at a particular equilibrium temperature can actually decrease by increasing the proportion of said residue in the feed, and vice versa. This is a highly important observation in accordance with the present invention because it is the quantity of 1050° F.+ residue actually vaporized which improves the octane value of the product and it is shown that the quantity of residue vaporized is not necessarily related to the proportion of residue in the feed at a fixed equilibrium temperature.

Figure 4:
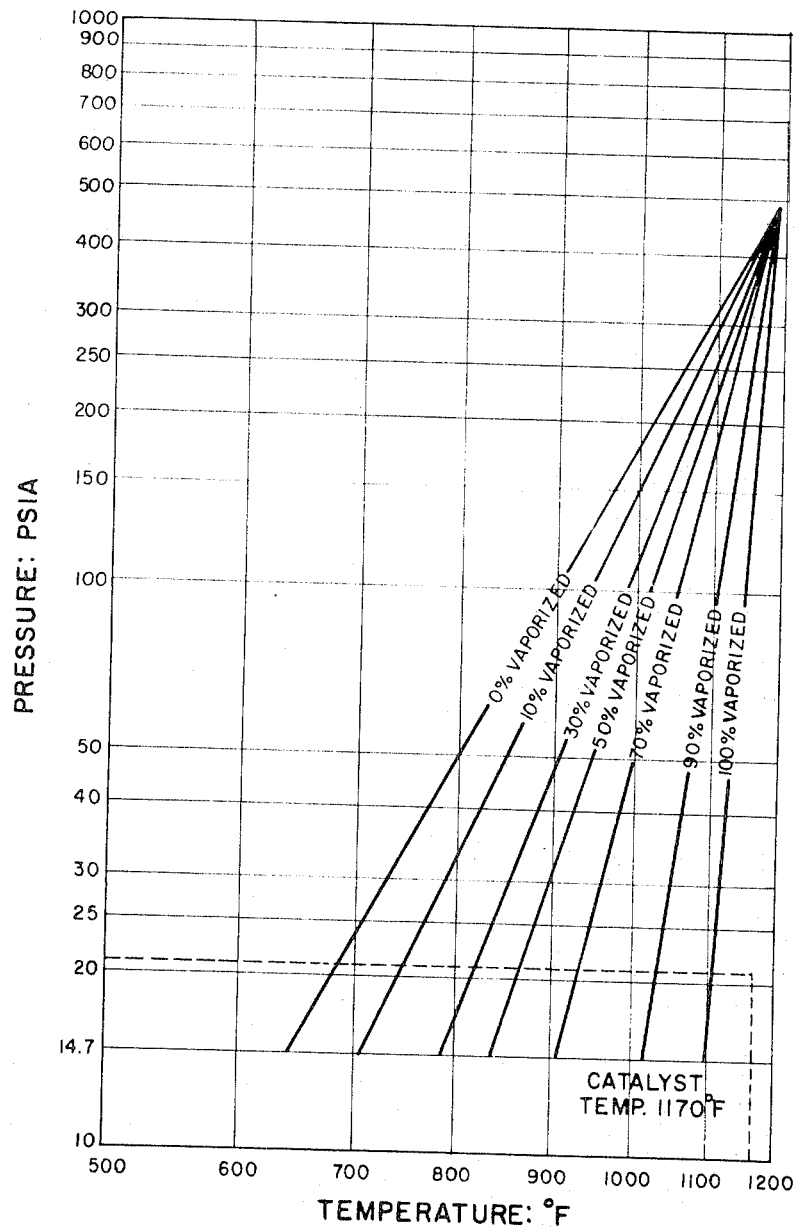
Figure 5:
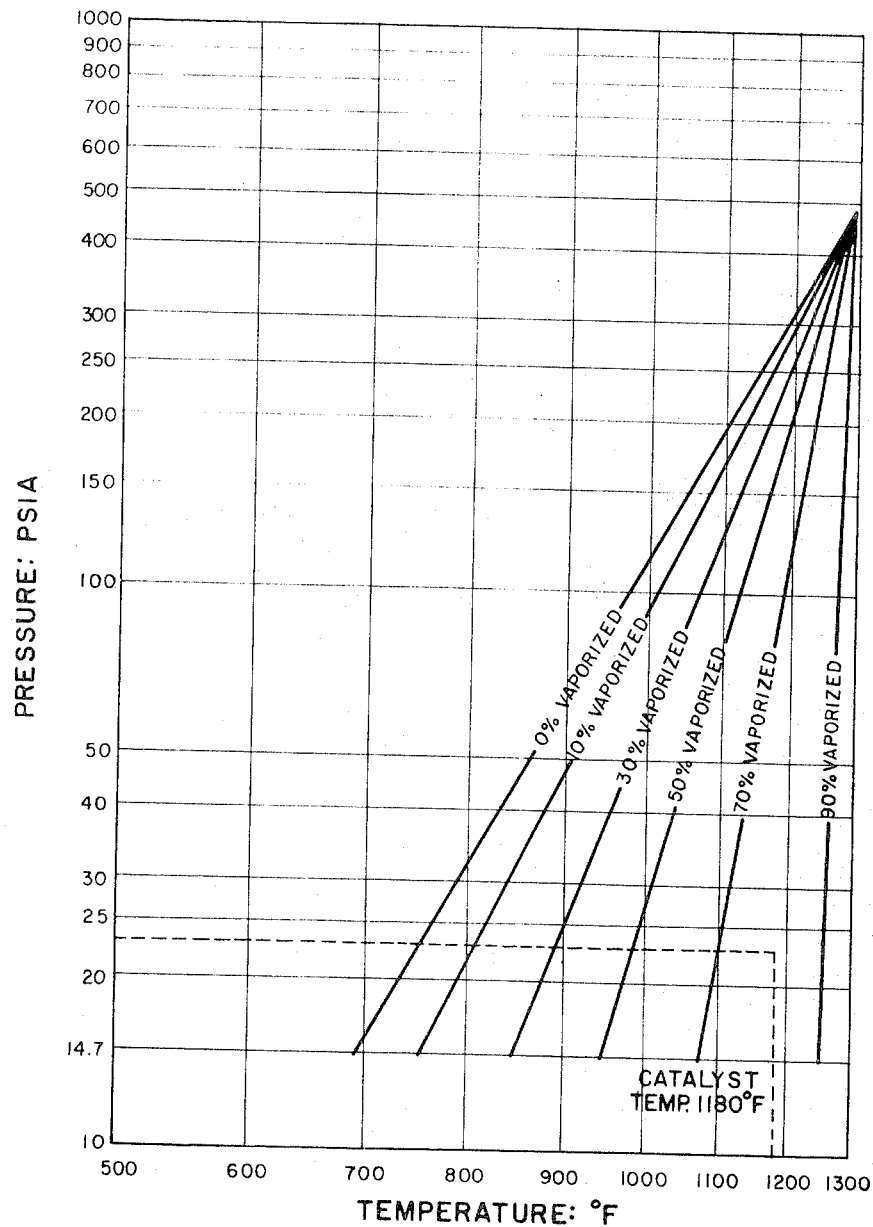
Figure 6:
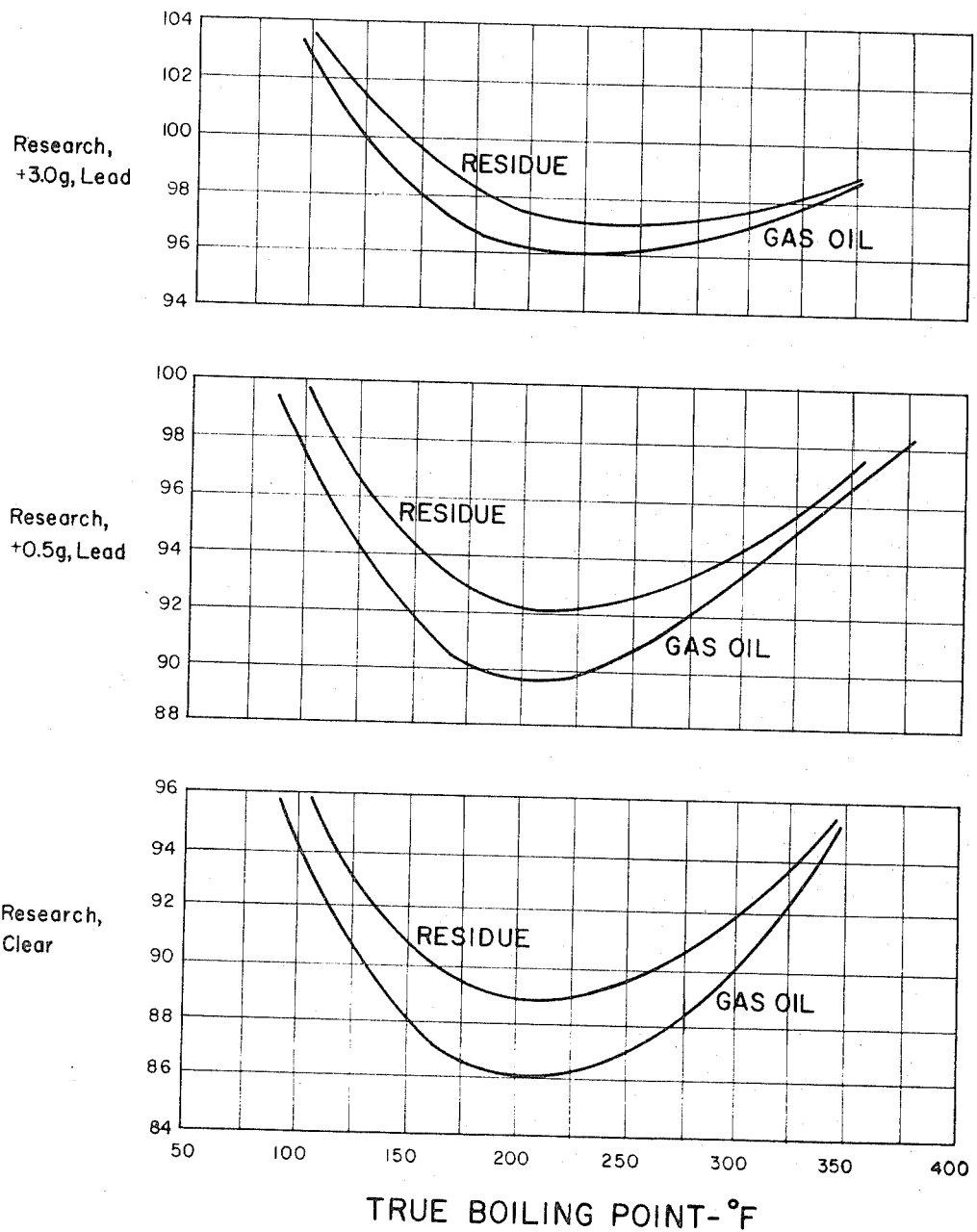

FIG. 4 is based upon the feed stock of FIG. 1 and FIG. 5 is based upon the feed stock of FIG. 3. FIGS. 4 and 5 relate the percentage of the feed vaporized to both equilibrium temperature and pressure in the riser. FIG. 4 indicates that with a regenerated catalyst temperature of 1170° F. it is possible to obtain a high degree of vaporization with the particular feed tested. In contrast, FIG. 5 shows that with a generally similar regenerated catalyst temperature of 1180° F., it is not possible to obtain sufficient feed vaporization to render the particular stock useful as an FCC feed in the process of the present invention.

A series of cracking tests were conducted in a riser with a fluid zeolite catalyst to illustrate more fully the octane improvement advantage of the present invention. All of the tests were performed under the following general conditions:

| | |
|---|---|
| Cracking temperature: °F. | 940–1,025 |
| Contact time: seconds | 0.4–3.6 |
| Reactor pressure: p.s.i.g. | 23–30 |
| Recycle rate: vol. percent of fresh feed | 0–5.0 |
| Catalyst-to-oil ratio: fresh feed | 7–12 |
| Regenerator temperature: °F. | 1,140–1,160 |
| Carbon on regenerated catalyst: wt. percent | 0.15–0.35 |
| Dispersion steam: lb./1,000 lb. catalyst | 2–9 |
| Stripping steam: lb./1,000 lb. catalyst | 4–8 |
| Feed preheat temperature: °F. | 250–650 |

Certain of the tests were performed with a South Louisiana full-range virgin gas oil while other of the tests were performed with a South Louisiana atmospheric tower bottoms. Following is a description of each of these charge stocks.

| | South Louisiana full-range virgin gas oil | South Louisiana atmospheric tower bottoms |
|---|---|---|
| Gravity, °API | 23.5 | 21.8 |
| Sulfur, wt. percent | 0.58 | 0.39 |
| Carbon residue, wt. percent | 0.19 | 3.06 |
| Total nitrogen, p.p.m. | 640 | 1,300 |
| Aniline point, °F. | 186 | 192 |
| Nickel, p.p.m. | 0.1 | 4.7 |
| Vanadium, p.p.m. | 0.1 | 1.2 |
| D1160 distillation, °F. at— | | |
| 10% | 688 | 664 |
| 30% | 745 | 774 |
| 50% | 805 | 857 |
| 70% | 873 | 969 |
| 90% | 944 | 1,120 |

The following is a tabulation of yield based on feed obtained when each charge was cracked at 1000° F. to obtain 75 percent conversion with a regenerated catalyst temperature of 1140° F.

| Charge stock | Gas oil | Atmospheric tower bottoms |
|---|---|---|
| Yields, vol. percent of fresh feed to FCC: | | |
| Debutanized gasoline | 55.5 | 52.0 |
| C₅= | 4.7 | 4.0 |
| C₆+ gasoline | 45.0 | 41.5 |
| Total C₄ | 17.5 | 16.5 |
| C₄= | 9.0 | 7.0 |
| Total C₃ | 11.0 | 10.5 |
| C₃= | 8.0 | 6.5 |
| Total C₃+ liquid | 109.0 | 104.0 |
| C₂ and lighter, wt. percent | 4.0 | 4.0 |
| Coke, wt. percent | 4.0 | 11.0 |
| Potential alkylate, vol. percent: | | |
| C₃ and C₄ | 29.7 | 23.6 |
| C₃ through C₅ | 39.4 | 31.8 |
| Total gasoline, vol. percent: | | |
| C₃–C₄ alkylation | 85.2 | 75.6 |
| C₃–C₅ alkylation | 90.2 | 79.8 |

For the same tests, following is a tabulation of yield based upon the crude from which the FCC feed was derived.

Basis of comparison: 1,000° F. riser cracking to obtain 75 percent conversion

| Charge stock | Gas oil | Atmospheric tower bottoms |
|---|---|---|
| Position on crude, vol. percent | 59–91 | 59–100 |
| Yield on crude, vol. percent | 32 | 41 |
| Gasoline yield from FCC, vol. percent on crude: | | |
| Debutanized gasoline | 17.76 | 21.32 |
| FCC gasoline plus alkylate: | | |
| C₃–C₄ alkylation | 27.26 | 31.0 |
| C₃–C₅ alkylation | 28.86 | 32.72 |

The above two tabulations show that the atmospheric tower bottoms produced a lower gasoline yield based upon feed to the riser than did the gas oil feed but the atmospheric tower bottoms produced a higher gasoline yield based upon crude because a greater proportion of the total crude was actually charged to the FCC unit in the case of the atmospheric tower bottoms.

Again, for the same tests, the following table presents a tabulation of octane number for both the light and heavy gasoline product fractions. The light gasoline product fraction has a boiling range of about 100 to 250° F. while the heavy gasoline fraction has a boiling range of about 250 to 430° F.

| | Gasoline product | | | |
|---|---|---|---|---|
| | Light | | Heavy | |
| Charge stock | Gas oil | Atmospheric tower bottoms | Gas oil | Atmospheric tower bottoms |
| Micro octane number: | | | | |
| Research: | | | | |
| Clear | 90.8 | 92.5 | 93.2 | 94.4 |
| +0.5 g | 94.7 | 96.8 | 95.3 | 96.7 |
| +3.0 g | 99.6 | 101.2 | 98.0 | 99.1 |
| Motor: | | | | |
| Clear | 79.0 | 80.0 | 82.2 | 82.0 |
| +0.5 g | 83.3 | 82.4 | 83.7 | 83.3 |
| +3.0 g | 88.4 | 86.9 | 86.6 | 85.7 |
| Lead susceptibility: | | | | |
| Research | 8.8 | 8.7 | 4.8 | 4.7 |
| Motor | 9.4 | 6.9 | 4.4 | 3.7 |
| Sensitivity: | | | | |
| Clear | 11.8 | 12.5 | 11.0 | 12.4 |
| +0.5 g | 11.4 | 14.4 | 11.6 | 13.4 |
| +3.0 g | 11.2 | 14.3 | 11.4 | 13.4 |
| Volume percent: | | | | |
| Aromatics | 5 | 7 | 64 | 59 |
| Olefins | 29 | 42 | 5 | 16 |
| Saturates | 66 | 51 | 31 | 25 |

The above data show that in accordance with the method of the present invention an improvement in octane value is achieved in both the light and heavy gasoline product when cracking a residual oil-containing charge in accordance with the present invention as compared to a distillate oil charge which does not contain residual oil.

The advantage of the present invention is illustrated most strikingly in FIGS. 6 through 9. These figures contain graphs based on the same series of tests tabulated above showing the relationship of both Research and Motor octane numbers to the particular gasoline product fractions whose mid-points have the indicated true boiling points for both 950 and 1000° F. riser outlet cracking temperatures. The graphs of FIGS. 6 through 9 show that the gasoline product of gas oil cracking exhibits the highest octane value at its highest and lowest boiling extremity fractions but its mid-boiling fraction exhibits the lowest octane value, indicating a considerable imbalance in octane value in the gasoline product depending upon boiling point. The dip in octane value of the mid-boiling fraction can require that the mid-boiling fraction be further treated for upgrading, for instance, by constituting a reformer feed stock or by recycle to the FCC unit, or, has been done commercially, the full range gasoline product is fractionated or split into a high octane blending stock for premium gasoline pool blends and a lower octane blending stock to regular gasoline pool blends. FIGS. 6 through 9 show that the great advantage of the residual oil cracking process of the present invention is that the low octane value mid-boiling fraction is upgraded without diminishing the high octane values of the high- and low-boiling extremity fractions, thereby imparting not only a higher average to the total gasoline product but also a better balance to the octane quality of the various incremental boiling fractions throughout the full boiling range of the gasoline product. This effect appears in FIGS. 6 through 9 as a tendency of the residual oil fraction to somewhat straighten the curve of octane value obtained from cracking a distillate gas oil at the same flash vaporization temperature and the straightening occurs by an improvement in the octane value of the gasoline components having the lowest octane value. Therefore, a great advantage of the present invention will arise in the instance of the introduction of sufficient residual oil to a gas oil distillate feed to upgrade a mid-boiling fraction of the gasoline product to an extent that previous recycling or reforming of the mid-boiling fraction is no longer required, although such recycling or reforming can still be performed if further octane improvement is desired. Also, the need for gasoline splitting or fractionation could be eliminated, if desired, since the full range gasoline quality is feasible for use directly in premium gasoline blends.

FIGS. 6 through 9 show that the present invention is capable of producing a gasoline of improved uniformity of octane number along its boiling range comprising the cracked products of a single flash vaporization of gas oil boiling range hydrocarbons having a true boiling point below 1050° F. together with residual oil having a true boiling point above 1050° F. The cracked products of the gas oil boiling range hydrocarbons are present in the gasoline in greater proportion than the cracked products of the 1050° F.+ residual oil. A middle-boiling fraction of the cracked products in the gasoline derived exclusively from the gas oil boiling range hydrocarbons has a relatively low Research clear octane value as compared to higher and lower boiling fractions in the gasoline of the cracked products derived exclusively from gas oil boiling range hydrocarbons. The proportion in the gasoline of the cracked products of the residual oil is sufficiently great to elevate by at least one number, or even two or three numbers, on an unleaded basis, the Research and/or Motor octane value of the lowest octane 25° F., 50° F. or 100° F. boiling range fraction of the cracked products derived exclusively from the gas oil boiling range hydrocarbons. The gasoline of this invention can either be blended or unblended with other gasoline. It can be leaded but is advantageously unleaded or contains less than one gram of lead per gallon, but it can contain greater quantities of lead.

EXAMPLE

Figure 10:
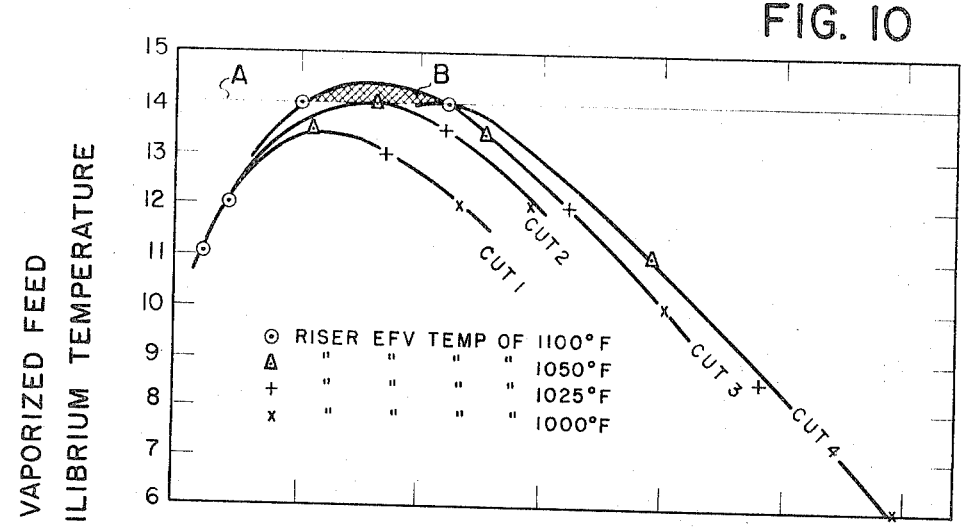
Figure 11:
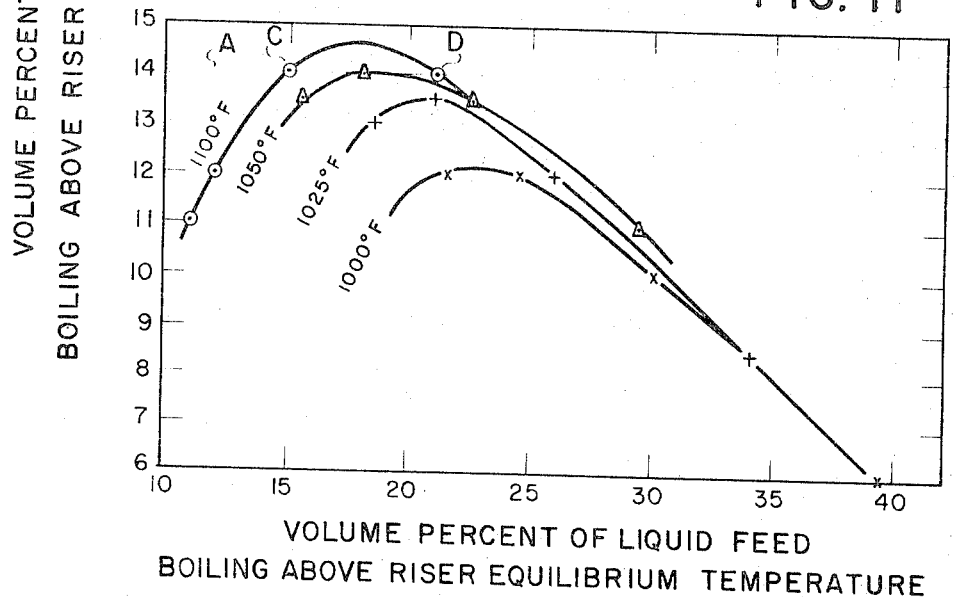

The data presented in Table 2 and illustrated in FIGS. 10 and 11 are based upon four FCC feed stocks prepared by atmospheric flashing of portions of a South Louisiana crude at 550° F., 650° F., 750° F. and 830° F., respectively. The bottoms of each crude flash is designated as cut 1, 2, 3 and 4, respectively, and each cut is vaporized at four equilibrium temperatures; 1000° F., 1025° F., 1050° F. and 1100° F. The data of Table 2 show, in part I, the distillation data for each cut and, in part II, the percentage of material having a true boiling point above the various riser equilibrium temperatures in both the feed liquid and the corresponding vapor for each cut.

TABLE 2

I. Distillation data

| | Cut Number | | | | | | | |
|---|---|---|---|---|---|---|---|---|
| | 1 (550° F.+bottoms) | | 2 (650° F.+bottoms) | | 3 (750° F.+bottoms) | | 4 (830° F.+bottoms) | |
| | TBP | EFV | TBP | EFV | TBP | EFV | TBP | EFV |
| Distribution, °F.: | | | | | | | | |
| IBP | | | 530 | | | | | |
| 10% | 540 | 606 | 640 | 702 | 750 | 811 | 830 | 884 |
| 30% | 705 | 716 | 760 | 781 | 830 | 857 | 890 | 915 |
| 50% | 825 | 795 | 850 | 835 | 910 | 895 | 960 | 955 |
| 70% | 940 | 872 | 963 | 902 | 1,000 | 960 | 1,045 | 1,010 |
| 90% | 1,110 | 990 | 1,120 | 1,016 | 1,150 | 1,045 | 1,185 | 1,087 |
| EP | | | 1,400 | 1,090 | | | | |

II. FCC riser Conditions (760 mm. Hg)

| | Feed cut number | | | | | | | | | | | | | | | |
|---|---|---|---|---|---|---|---|---|---|---|---|---|---|---|---|---|
| | 1 | | | | 2 | | | | 3 | | | | 4 | | | |
| Riser equil. temp., °F | 1,100 | 1,050 | 1,025 | 1,000 | 1,100 | 1,050 | 1,025 | 1,000 | 1,100 | 1,050 | 1,025 | 1,000 | 1,100 | 1,050 | 1,025 | 1,000 |
| Vol. percent of liquid feed boiling above riser equil. temp | 11.0 | 15.5 | 18.5 | 21.5 | 12.0 | 18.0 | 21.0 | 24.5 | 15.0 | 22.5 | 26.0 | 30.0 | 21.0 | 29.5 | 34.0 | 39.5 |
| Vol. percent of vaporized feed boiling above riser equil. temp | 11.0 | 13.5 | 13.0 | 12.0 | 12.0 | 14.0 | 13.5 | 12.0 | 14.0 | 13.5 | 12.0 | 10.0 | 14.0 | 11.0 | 8.5 | 6.0 |

The curves of FIGS. 10 and 11 are based upon the data of Table 2. These curves illustrate the high degree of interdependence between the concentration of residue in gas oil boiling range hydrocarbons in the feed liquid on the one hand and the equilibrium flash vaporization temperature at the bottom of an FCC riser on the other hand if an amount of residue is to be vaporized at the bottom of the FCC riser which is sufficient to enhance the octane value of the gasoline product. Assuming an FCC process wherein an improvement in gasoline octane value requires that more than 14 percent of the vapor at the bottom of the FCC riser have a true boiling point above the equilibrium flash vaporization temperature (as indicated by lines A in FIGS. 10 and 11), it is shown in FIG. 10 that of the four feeds tested only one is capable of providing a vapor adequately rich in residue hydrocarbons while it is shown in FIG. 11 that of four flash equilibrium temperatures tested, only one is capable of providing a vapor adequately rich in residue hydrocarbons to achieve the octane improvement of the invention. FIG. 10 shows that cut 4, which is the FCC liquid feed which is richest in residue hydrocarbons of the four cuts tested, is not capable of producing a flashed vapor adequately rich in residue hydrocarbons. This is indicated by the fact that the curve representing cut 4 does not extend above line A of FIG. 10, although the curve of cut 3, which is poorer in residue, does extend above line A. FIG. 11 shows the high degree of interdependence between the residue concentration in the feed liquid and the riser equilibrium flash vaporization temperature because in the uppermost curve of FIG. 11, which is the only curve which extends above line A, only a feed containing between about 15 and 21 volume percent of residue boiling above the equilibrium temperature can produce a corresponding concentration of residue in the vapor which exceeds line A.

The cross-hatched area B of FIG. 10 defines the intermediate concentration range of residue in the feed liquid above and below which range the corresponding concentration of residue in the vapor is not sufficiently high to achieve the required octane improvement in the present example. FIG. 10 shows that the required corresponding concentration of residue in the vapor is not achieved unless the feed liquid contains a very narrowly circumscribed concentration range of said residue, i.e. a minimum of 15 volume percent of said residue and a maximum of 21 volume percent of said residue.

A surprising observation regarding FIG. 11 is that as the equilibrium flash vaporization temperature increases, it is necessary to decrease the concentration of residuum in the feed and this combination of changes tends to increase the corresponding optimum percentages of the vapor having a true boiling point above the equilibrium temperature. Therefore, according to the present invention, the required concentration of residue in the feed liquid tends downward as the equilibrium temperature increases. FIG. 11 indicates that with the particular feed stocks shown the concentration of residue in the feed preferably should be below 25 volume percent, i.e. the feed preferably should comprise at least 75 percent of gas oil. Therefore, FIG. 10 and FIG. 11 both show it is possible to optimize residue content in the vapor by decreasing residue content in the feed liquid.

The advantage of an awareness of the method of this invention is further emphasized by comparing points C and D of FIG. 11. Although both points represent 14 percent of residue material in the vapor, point C accomplishes this residue vapor concentration with only 15 percent of residue material in the liquid feed while point D accomplishes this vapor concentration with 21 percent of residue in the feed. Since the additional residue at point D will not be vaporized, it will tend to deposit on the hot catalyst and become coke. Therefore, the extra six percent of residue in the liquid feed at point D results in a higher coke make at point D than at point C. Where the FCC unit can achieve a heat balanced operation at a desired regenerated catalyst temperature, it is therefore apparent that the best mode of operating the present invention is to operate closer to point C than point D.

We claim:

1. A process for fluidized zeolite riser cracking to a gasoline product at a residence time of less than five seconds of a hydrocarbon feed comprising a mixture of distillate gas oil boiling range hydrocarbons having a true boiling point below 1050° F. together with between 15 and 30 volume percent of residual oil having a true boiling point above 1050° F., the hydrocarbon oil feed mixture and catalyst feed reaching an equilibrium flash vaporization temperature at the riser inlet, the proportion of the residual oil in said feed mixture at said flash vaporization temperature both increasing the percent by volume of gasoline yield as compared to zeolite cracking of said distillate gas oil exclusively at said flash vaporization temperature and elevating by at least one octane number the 175 to 250° F. product fraction as compared to zeolite cracking of said gas oil exclusively at said flash vaporization temperature.

2. The process of claim 1 wherein less than 100 percent of the feed oil is vaporized at said equilibrium flash vaporization temperature.

3. The process of claim 1 wherein the gasoline product fraction having an enhanced octane number includes the lowest research clear octane number fraction of the full-range gasoline.

4. The process of claim 1 wherein the gasoline product has a 380° F. end point.

5. The process of claim 1 wherein the gasoline product has a 360° F. end point.

6. The process of claim 1 wherein the gasoline product has an end point of 400° F., or higher.

7. The process of claim 1 wherein the octane number is an unleaded research or motor octane number.

8. The process of claim 1 wherein the octane number is a leaded research or motor octane number.

9. The process of claim 1 wherein the residue oil comprises 15 to 25 volume percent of the feed mixture.

10. A process for fluidized zeolite riser cracking to a gasoline product at a residence time of less than five seconds of a hydrocarbon feed comprising a mixture of distillate gas oil boiling range hydrocarbons having a true boiling point below 1050° F. together with residual oil having a true boiling point above 1050° F., the hydrocarbon oil feed mixture and the catalyst feed reaching an equilibrium flash vaporization temperature at the riser inlet, controlling the concentration of 1050° F.+ residue in the feed liquid mixture between 15 and 30 volume percent of the mixture in relation to said equilibrium temperature to obtain substantially an optimum concentration of said residue in the vapor at said equilibrium temperature, the proportion of the residual oil in said feed mixture both increasing the percent by volume of gasoline yield as compared to zeolite cracking of said distillate gas oil exclusively at said flash equilibrium temperature and elevating by at least one octane number the 175 to 250° F. product fraction as compared to zeolite cracking of said gas oil exclusively at said flash equilibrium temperature.

11. The process of claim 10 wherein the gasoline product having the enhanced octane number includes the lowest research clear octane number fraction.

12. The process of claim 10 wherein the gasoline product has a 380° F. end point.

13. The process of claim 10 wherein the gasoline product has a 360° F. end point.

14. The process of claim 10 wherein the gasoline product has an end point of 400° F., or higher.

15. The process of claim 10 wherein the reactor outlet temperature is 900 to 1100° F.

16. The process of claim 10 wherein the octane number is an unleaded research or motor octane number.

17. The process of claim 10 wherein the octane number is a leaded research or motor octane number.

18. The process of claim 10 wherein the residue comprises 15 to 25 volume percent of the feed mixture.

19. The process of claim 10 wherein the residue comprises 15 to 21 volume percent of the feed mixture.

(References on following page)

References Cited

UNITED STATES PATENTS

| | | | |
|---|---|---|---|
| 2,982,718 | 5/1961 | Constantikes | 208—113 |
| 2,994,659 | 8/1961 | Slyngstad et al. | 208—113 |
| 3,042,196 | 7/1962 | Payton et al. | 208—113 |
| 3,092,568 | 6/1963 | Atteridg | 208—113 |
| 3,706,654 | 12/1972 | Bryson et al. | 208—74 |
| 3,671,420 | 6/1972 | Wilson et al. | 208—61 |
| 3,055,822 | 9/1962 | Honerkamp et al. | 208—61 |

DELBERT E. GANTZ, Primary Examiner

G. E. SCHMITKONS, Assistant Examiner

U.S. Cl. X.R.

208—16, 113